(12) United States Patent
Uetabira

(10) Patent No.: US 11,594,062 B2
(45) Date of Patent: Feb. 28, 2023

(54) BIOMETRIC AUTHENTICATION DEVICE WITH INFECTION PREVENTIVE FUNCTION

(71) Applicant: INTERMAN Corporation, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 0 days.

(21) Appl. No.: 17/365,195

(22) Filed: Jul. 1, 2021

(65) Prior Publication Data

US 2022/0012458 A1    Jan. 13, 2022

(30) Foreign Application Priority Data

Jul. 7, 2020   (JP) .............................. JP2020-117165

(51) Int. Cl.
| | |
|---|---|
| *G06V 40/13* | (2022.01) |
| *G06F 3/01* | (2006.01) |
| *G06F 21/32* | (2013.01) |
| *G06V 40/12* | (2022.01) |

(52) U.S. Cl.
CPC .......... *G06V 40/1312* (2022.01); *G06F 3/016* (2013.01); *G06F 21/32* (2013.01); *G06V 40/1341* (2022.01)

(58) Field of Classification Search
CPC .... G06V 40/12; G06V 40/13; G06V 40/1306; G06V 40/1312; G06V 40/1341; G06V 40/1329; G06V 40/14; G06V 40/145; G06V 40/1365; G06V 40/1318; G06V 40/1324; G06V 40/1335; G06V 40/1347; G06F 21/32; G06K 9/00006; G06K 9/00013; G06K 9/0002; G06K 9/00033; G06K 9/00053; G06K 9/0006
USPC ........................................................ 382/124
See application file for complete search history.

(56) References Cited

U.S. PATENT DOCUMENTS

| | | | | |
|---|---|---|---|---|
| 4,537,484 A | * | 8/1985 | Fowler .................. | G06V 40/63 382/126 |
| 8,243,131 B2 | * | 8/2012 | Choi .................. | G06V 40/1312 382/125 |
| 8,600,123 B2 | * | 12/2013 | Abramovich ...... | G06V 40/1312 382/126 |

(Continued)

FOREIGN PATENT DOCUMENTS

| | | |
|---|---|---|
| JP | 2016-224692 A | 12/2016 |
| JP | 2018-60291 A | 4/2018 |

*Primary Examiner* — Koosha Sharifi-Tafreshi
(74) *Attorney, Agent, or Firm* — Maier & Maier, PLLC

(57) ABSTRACT

A biometric authentication device with infection preventive function to prevent infection of pathogens such as virus, bacteria and the like is described. The biometric authentication device with infection preventive function includes: an image acquisition unit configured to take an image of a finger of a person to be authenticated; an authentication processing unit configured to performs an authentication process by the use of biometric information contained in the taken image; and a contact prevention unit configured to prevent the finger of the person to be authenticated from coming in contact with the biometric authentication device by leading the finger of the person to be authenticated to a predetermined position in relation to the biometric authentication device by the tactile sensation.

4 Claims, 4 Drawing Sheets

(56) References Cited

U.S. PATENT DOCUMENTS

| | | | |
|---|---|---|---|
| 2005/0089204 A1* | 4/2005 | Carver | G06V 40/1324 382/127 |
| 2011/0129128 A1* | 6/2011 | Makimoto | G06V 40/1394 382/124 |
| 2012/0076369 A1* | 3/2012 | Abramovich | G06V 40/1312 382/126 |
| 2015/0130917 A1* | 5/2015 | Mil'shtein | G06V 40/1312 348/77 |
| 2021/0287025 A1* | 9/2021 | Min | G07C 9/00912 |

* cited by examiner

BIOMETRIC AUTHENTICATION DEVICE WITH INFECTION PREVENTIVE FUNCTION

CROSS-REFERENCE TO RELATED APPLICATIONS

The present application claims priority under 35 U.S.C. § 119 to Japanese Patent Application No. P2020-117165, filed on Jul. 7, 2020 including description, claims, drawings, and abstract. The contents of this application are herein incorporated by reference in their entirety.

BACKGROUND OF THE INVENTION

Field of the Invention

The present invention relates to a biometric authentication device with infection preventive function to prevent infection of pathogens such as virus, bacteria and the like.

The new coronavirus has occurred a pandemic and let people know how the densely populated, high-speed and volume transportation society in the 21st century is vulnerable to an infectious disease.

In such a situation, everything around us looks an infectious agent so that daily life becomes confining. In fact, it seems necessarily to doubt everything in an infection spread situation.

While it is important to take measures such as wearing a mask, keeping sufficient distances from others, avoiding all crowded spaces, it is inevitable to make minimum contact with an infection route for carrying out life in society. To minimize this risk as small as possible is vital for preventing infection.

One of infection routes which we should be careful of is routes via fingers, particularly, routes through things which are touched by the unspecified number of people. While it is better to avoid touching such things, occasionally that would be difficult. For example, when fingerprint authentication or vein authentication is required, it is needed to make direct contact with an authentication device. Accordingly, it is inevitable to make indirect contact with others through the contact surface so that there is a fear of infecting or getting infected with pathogens.

For example, in the case of conventional fingerprint authentication devices and vein authentication devices, information about fingerprint and vein is obtained by pressing and fixing a finger tip to a predetermined surface of the device to take an image of the fixed finger tip (for example, refer to Japanese Patent Published Application No. 2018-60291 and Japanese Patent Published Application No. 2016-224692). In order to prevent infection through such a device, sterilization must be done each time authentication is performed, and this troublesome process requires the manpower.

Taking into consideration the above circumstances, it is an object of the present invention therefore to provide a biometric authentication device with infection preventive function to prevent infection of pathogens such as virus, bacteria and the like.

SUMMARY OF THE INVENTION

To achieve at least one of the above-mentioned objects, reflecting one aspect of the present invention, a biometric authentication device with infection preventive function comprises: an image acquisition unit configured to take an image of a finger of a person to be authenticated; an authentication processing unit configured to performs an authentication process by the use of biometric information contained in the taken image; and a contact prevention unit configured to prevent the finger of the person to be authenticated from coming in contact with the biometric authentication device by leading the finger of the person to be authenticated to a predetermined position in relation to the biometric authentication device.

In accordance with one embodiment of the biometric authentication device with infection preventive function, it is preferred that the contact prevention unit is an ultrasonic tactile sensation producing device for virtually producing a tactile sensation in a space by an acoustic radiation pressure of supersonic waves radiated from an ultrasonic vibrator transducer array to lead the finger of the person to be authenticated to the predetermined position in relation to the biometric authentication device by the tactile sensation.

For example, the biometric information for use in the authentication process is information about a pattern of finger vein.

Alternatively, the biometric information for use in the authentication process is information about fingerprint.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Embodiment 1

In what follows, a biometric authentication device with infection preventive function in accordance with an embodiment 1 of the present invention will be explained with reference to the accompanying drawings. This biometric authentication device can perform authentication without requiring the user (person to be authenticated) to make direct contact with the device so that no contact infection route can be formed.

Figure 1:
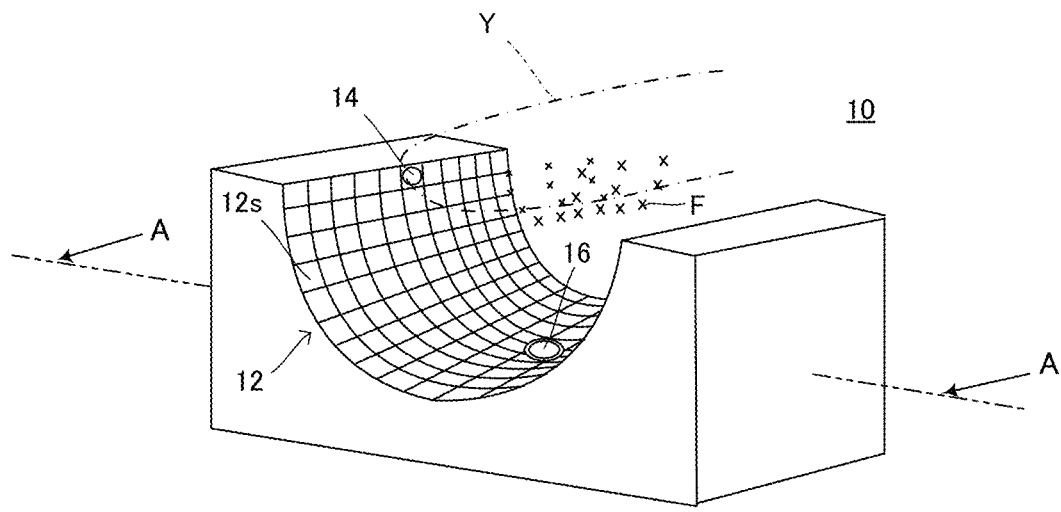
FIG. 1 is a perspective view for showing a finger vein authentication device 10 which is a biometric authentication device with infection preventive function in accordance with an embodiment 1 of the present invention.
Figure 2:
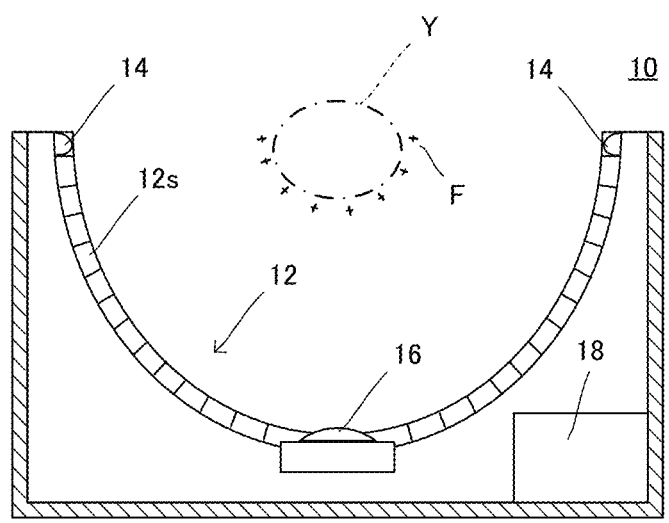
FIG. 2 is a cross sectional view along A-A line of FIG. 1 for showing the finger vein authentication device 10 in accordance with the embodiment 1 of the present invention.

FIG. 1 is a perspective view for showing a finger vein authentication device 10 which is a biometric authentication device with infection preventive function in accordance with the embodiment 1 of the present invention, and FIG. 2 is a cross sectional view along A-A line of FIG. 1. Namely, FIG. 2 is a cross sectional view of cutting the finger vein authentication device along the plane perpendicular to the arrow shown in FIG. 1.

This finger vein authentication device 10 includes an ultrasonic vibrator transducer array 12 arranged in the form of a semicircular cylinder, a pair of infrared light LEDs 14 located in the mid of upper edges of the semicircular cylinder of the ultrasonic vibrator transducer array 12, an infrared camera 16 located in the center of the bottom of the semicircular cylinder of the ultrasonic vibrator transducer array 12, and a signal control unit 18 for controlling the ultrasonic vibrator transducer array 12, the infrared light LED 14 and the infrared camera 16 and performing an authentication process in cooperation with a computer connected through a USB terminal (not shown in the figure). Incidentally, illustration of wirings, power supply and the like circuitry for connecting the signal control unit 18 with the above elements is omitted for the sake of clarity in explanation.

When this finger vein authentication device 10 is used to perform authentication, the user keeps a finger tip up on the central axis of the semicircular cylinder of the ultrasonic vibrator transducer array 12. Then, the infrared light LEDs 14 irradiates the finger tip with near infrared light. This near infrared light is passed through the inside of the finger tip, and partially absorbed by reduced hemoglobin in the blood, so that the vein inside the finger tip is imaged by the infrared camera 16 to acquire the shadow pattern of the finger vein as an image signal. The image signal as acquired is processed by the signal control unit 18, and transmitted to the computer connected to the signal control unit 18 through the USB terminal (not shown in the figure) to performs finger vein authentication.

In this case, there is a problem that it is difficult to focus on the finger tip of the user because the finger tip has to be kept in the air and is hard to be stabilized in a predetermined position. Besides, in some cases, the finger tip may come in contact with the finger vein authentication device 10. Taking into consideration this problem, in the case of the finger vein authentication device 10 according to the present embodiment, the finger tip is guided in the air by an acoustic radiation pressure of supersonic waves radiated from the ultrasonic vibrator transducer array 12 as explained below.

The ultrasonic vibrator transducer array 12 consists of a number of ultrasonic vibrator transducers 12s having a resonance frequency of 40 kHz. The signal control unit 18 separately gives a control signal to each ultrasonic vibrator transducer 12s to form focuses at arbitrary positions by independently controlling the strength and phase of the control signal. In other words, the ultrasonic vibrator transducer array 12 serves as an ultrasonic tactile sensation producing device for virtually producing a tactile sensation in a space in cooperation with the signal control unit 18 which generates the control signals.

In this case, the ultrasonic vibrator transducers 12s are controlled in order to form multiple focuses F on a small semicircular cylinder concentrically positioned with the central axis of the semicircular cylinder of the ultrasonic vibrator transducer array 12. The diameter of the small semicircular cylinder is slightly larger than that of the finger tip Y of the person.

The acoustic radiation pressure at the focuses F can produce tactile sensation in the air. Namely, when the finger tip Y comes to this focuses F, there is given tactile impression of touching something. This tactile impression can lead the finger tip Y to a predetermined position. The user is asked to keep the finger tip Y in the predetermined position where he can get the tactile impression. In this position, it is easy to focus the infrared camera 16, and there is no fear that the finger tip Y of the user may come in contact with the finger vein authentication device 10.

Meanwhile, while the finger tip Y is held from below by the semicylindrically arranged focuses in the case of the above example, upper focuses may additionally be formed in order to position the finger tip Y from above. In other words, the ultrasonic vibrator transducer array may be installed in the form of a cylinder to form a cylindrical arrangement of focuses.

In addition to this, since the finger tip Y does not come in contact with the finger vein authentication device in the case of the above example, contact infection can be prevented. Furthermore, an ultraviolet LED may be installed in the vicinity of the infrared light LEDs 14 to irradiate the finger tip Y and the finger vein authentication device with ultraviolet light emitted from this ultraviolet LED to perform sterilization. By this configuration, the risk of infection can be further decreased.

Embodiment 2

While the pattern of finger vein is employed as biometric information used in the biometric authentication device in the case of the example of the above embodiment 1, the present invention is not limited thereto. For example, the present invention can be implemented by making use of fingerprint as biometric information. In the case of this embodiment 2, fingerprint is employed as biometric information.

Figure 3:
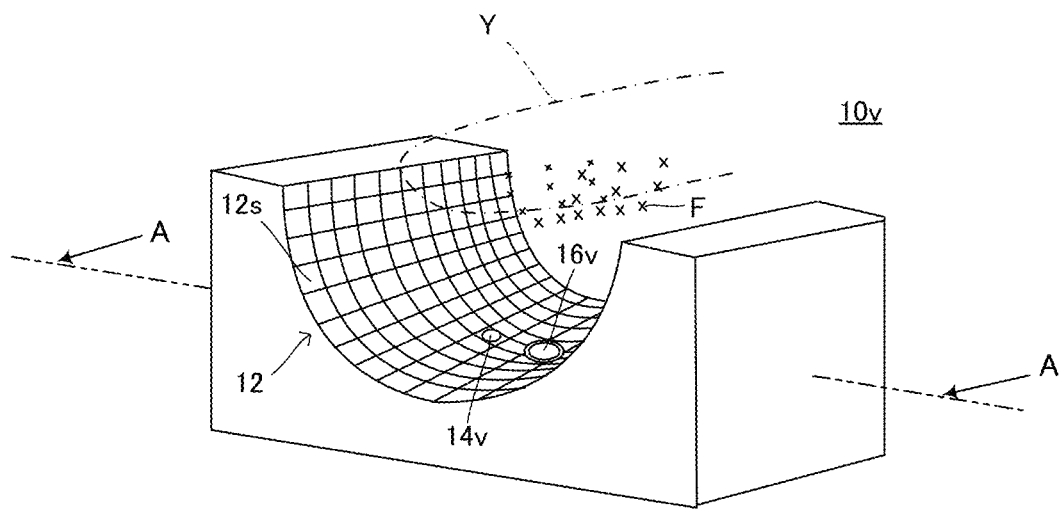
FIG. 3 is a perspective view for showing a fingerprint authentication device 10v which is a biometric authentication device with infection preventive function in accordance with an embodiment 2 of the present invention.
Figure 4:
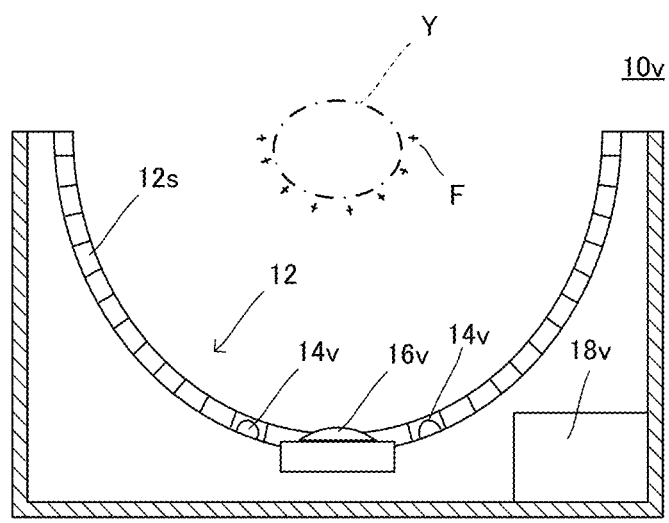
FIG. 4 is a cross sectional view along A-A line of FIG. 3 for showing the fingerprint authentication device 10v in accordance with the embodiment 2 of the present invention.

FIG. 3 is a perspective view for showing a fingerprint authentication device 10v which is a biometric authentication device with infection preventive function in accordance with the embodiment 2 of the present invention, and FIG. 4 is a cross sectional view along A-A line of FIG. 3. Namely, FIG. 4 is a cross sectional view of cutting the finger vein authentication device along the plane perpendicular to the arrow shown in FIG. 3.

The fingerprint authentication device 10v according to the embodiment 2 includes many elements common to those of the finger vein authentication device 10 according to the embodiment 1. Accordingly, like reference numbers given to FIG. 3 and FIG. 4 indicate functionally similar elements as those of FIG. 1 and FIG. 2, and therefore no redundant description is repeated.

Since fingerprint is employed as biometric information in this embodiment, the image of the surface pattern of the finger tip Y is taken so that the light for imaging is visible light. Because of this, in the embodiment 2, the infrared light LEDs 14 of the embodiment 1 are replaced by white LEDs 14v, and the infrared camera 16 of the embodiment 1 is replaced by a camera 16v for taking images with visible light.

The image signal as acquired by the camera 16v is processed by the signal control unit 18v, and transmitted to the computer connected to the signal control unit 18*v* through the USB terminal (not shown in the figure) to performs conventional fingerprint authentication.

Like the above embodiment 1, semicylindrically arranged focuses F are formed by the ultrasonic vibrator transducer array 12 to produce tactile sensation in the air by the acoustic radiation pressure at the focuses F and hold the finger tip Y from below. Namely, when the finger tip Y comes to this focuses F, there is given tactile impression of touching something. This tactile impression can lead the finger tip Y to a predetermined position. The user is asked to keep the finger tip Y in the predetermined position where he can get the tactile impression. In this position, it is easy to focus the camera 16*v*, and there is no fear that the finger tip Y of the user may come in contact with the fingerprint authentication device 10*v*.

Embodiment 3

In what follows, a biometric authentication device with infection preventive function in accordance with an embodiment 3 of the present invention will be explained with reference to the accompanying drawings. This biometric authentication device with infection preventive function inactivates or destroys pathogens such as virus, bacteria and the like by the use of ultraviolet light for infection prevention.

Figure 5:
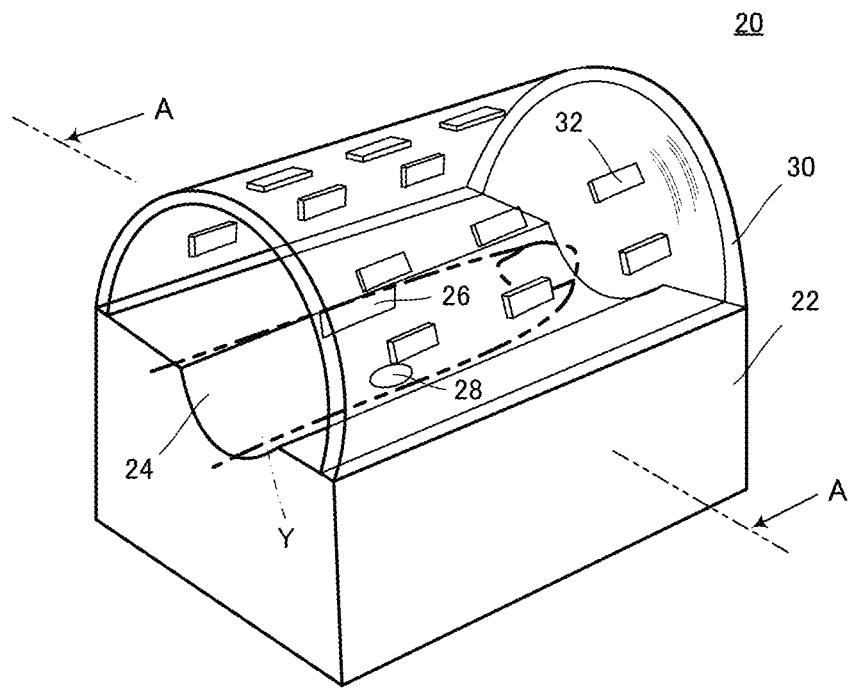
FIG. 5 is a perspective view for showing a finger vein authentication device 20 which is a biometric authentication device with infection preventive function in accordance with an embodiment 3 of the present invention.
Figure 6:
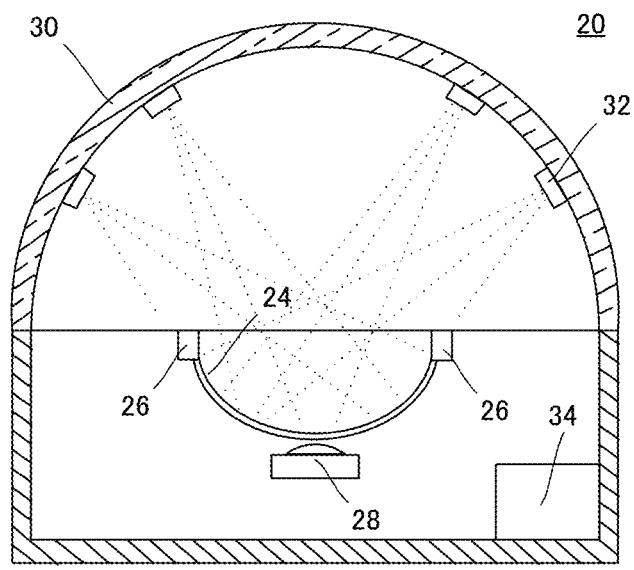
FIG. 6 is a cross sectional view along A-A line of FIG. 5 for showing the finger vein authentication device 20 in accordance with the embodiment 3 of the present invention.

FIG. 5 is a perspective view for showing a finger vein authentication device 20 which is a biometric authentication device with infection preventive function in accordance with the embodiment 3 of the present invention, and FIG. 6 is a cross sectional view along A-A line of FIG. 5. Namely, FIG. 6 is a cross sectional view of cutting the finger vein authentication device along the plane perpendicular to the arrow shown in FIG. 5.

The finger vein authentication device 20 includes an approximately cubic main body 22, an indent section 24 formed on the upper surface of this main body 22, a pair of infrared LEDs 26 installed in the opposite edges of this indent section 24, an infrared camera 28 installed below the center of the bottom portion of the indent section 24, a semicylindrical cover 30 which covers the upper surface of the main body 22, a number of ultraviolet LEDs 32 arranged on the inner surface of the semicylindrical cover 30 and a signal control unit 34 for controlling the infrared LEDs 26, the infrared camera 28 and the ultraviolet LEDs 32 and performing an authentication process in cooperation with a computer connected through a USB terminal (not shown in the figure). Incidentally, illustration of wirings, power supply and the like circuitry for connecting the signal control unit 34 with the above elements is omitted for the sake of clarity in explanation.

The indent section 24 of the main body 22 is U-shaped in cross section in order that when the user places a finger thereon, positioning is easily executed. When performing finger vein authentication, the infrared LEDs 26 irradiates the finger tip Y from both sides with near infrared light which is passed through the inside of the finger tip Y to acquire the shadow pattern of the finger vein as an image signal with the infrared camera 28.

The finger vein authentication device is often used by a number of persons for room entry restriction so that it may become the route of infection. Particularly, the indent section 24 formed on the upper surface of the main body 22 is directly touched by the finger tip Y so that when a number of users have touched, virus may probably be attached thereto.

For this reason, in the case of the finger vein authentication device 20 according to the present embodiment, the indent section 24 and the areas thereabout are irradiated for sterilization with ultraviolet light emitted from the ultraviolet LEDs 32 which are arranged on the inner surface of the semicylindrical cover 30. Specifically speaking, after the pattern of finger vein is imaged by the infrared camera 28, the departure of the finger tip Y from the indent section 24 is detected with reference to the output of the infrared camera 28, and then the ultraviolet LEDs 32 radiate ultraviolet light with the timing of the detection.

Alternatively, sterilization of the inside of the fingerprint authentication device 20 may be performed before finger vein authentication by manually emitting ultraviolet light from the ultraviolet LEDs 32 in advance of placing the finger tip Y on the indent section 24. In this case, since sterilization can visually be confirmed in advance of placing the finger tip into the finger vein authentication device 20, the user feels assured.

Meanwhile, the semicylindrical cover 30 is made of a transparent acrylic material so that the user can easily place the finger tip on the indent section 24. This acrylic material contains an ultraviolet light shielding agent to prevent ultraviolet light from leaking out from the finger vein authentication device 20. Accordingly, it is possible to protect user's health from harmful ultraviolet light when using this finger vein authentication device 20.

Embodiment 4

While the pattern of finger vein is employed as biometric information used in the biometric authentication device in the case of the example of the above embodiment 3, the present invention is not limited thereto. For example, the present invention can be implemented by making use of fingerprint as biometric information. In the case of this embodiment 4, fingerprint is employed as biometric information.

Figure 7:
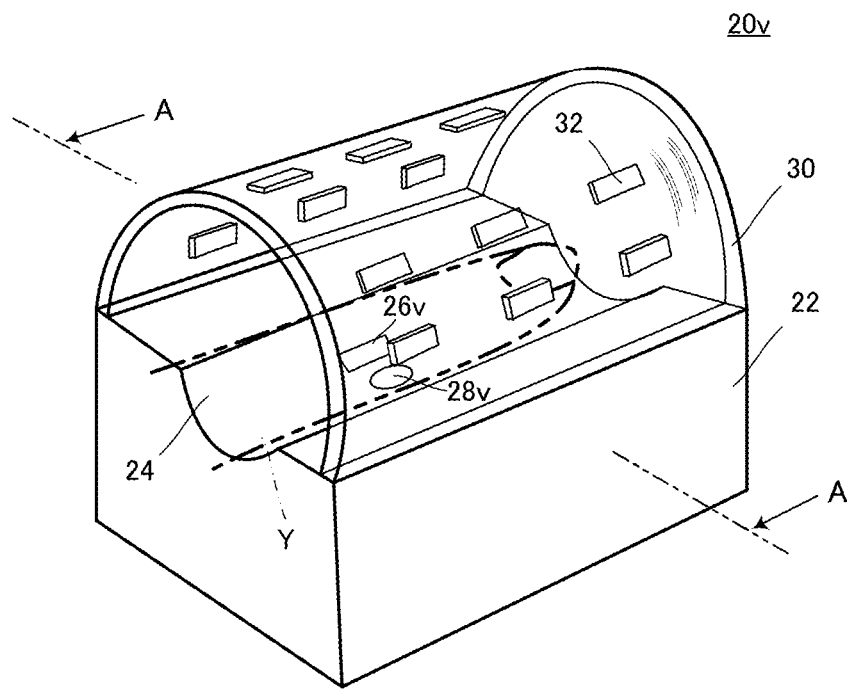
FIG. 7 is a perspective view for showing a fingerprint authentication device 20v which is a biometric authentication device with infection preventive function in accordance with an embodiment 4 of the present invention.
Figure 8:
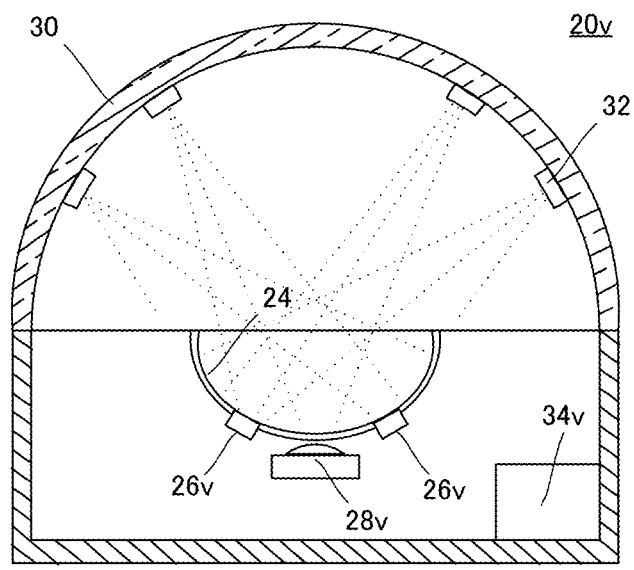
FIG. 8 is a cross sectional view along A-A line of FIG. 7 for showing the fingerprint authentication device 20v in accordance with the embodiment 4 of the present invention.

FIG. 7 is a perspective view for showing a fingerprint authentication device 20*v* which is a biometric authentication device with infection preventive function in accordance with the embodiment 4 of the present invention, and FIG. 8 is a cross sectional view along A-A line of FIG. 7. Namely, FIG. 8 is a cross sectional view of cutting the finger vein authentication device along the plane perpendicular to the arrow shown in FIG. 7.

The fingerprint authentication device 20*v* according to the embodiment 4 includes many elements common to those of the finger vein authentication device 20 according to the embodiment 3. Accordingly, like reference numbers given to FIG. 7 and FIG. 8 indicate functionally similar elements as those of FIG. 5 and FIG. 6, and therefore no redundant description is repeated.

Since fingerprint is employed as biometric information in this embodiment, the image of the surface pattern of the finger tip Y is taken so that the light for imaging is visible light. Because of this, in the embodiment 4, the infrared light LEDs 26 of the embodiment 3 are replaced by white LEDs 26*v*, and the infrared camera 28 of the embodiment 3 is replaced by a camera 28*v* for taking images with visible light.

The image signal as acquired by the camera 28*v* is processed by the signal control unit 34*v*, and transmitted to the computer connected to the signal control unit 34*v* through the USB terminal (not shown in the figure) to performs conventional fingerprint authentication.

Likewise the above embodiment 3, the indent section 24 and the areas thereabout are irradiated for sterilization with ultraviolet light emitted from the ultraviolet LEDs 32 which are arranged on the inner surface of the semicylindrical cover 30. Specifically speaking, after the pattern of finger vein is imaged by the infrared camera 28v, the departure of the finger tip Y from the indent section 24 is detected with reference to the output of the infrared camera 28v, and then the ultraviolet LEDs 32 radiate ultraviolet light with the timing of the detection.

Alternatively, sterilization of the inside of the fingerprint authentication device 20v may be performed before finger vein authentication by manually emitting ultraviolet light from the ultraviolet LEDs 32 in advance of placing the finger tip Y on the indent section 24. In this case, since sterilization can visually be confirmed in advance of placing the finger tip into the finger vein authentication device 20, the user feels assured.

Accordingly, in the case of the biometric authentication device with infection preventive function of the present invention, even in the case where a number of users make use of the biometric authentication device one after another, it is possible to prevent pathogens from spreading from person to person.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A biometric authentication device with an infection preventive function comprising:
    a camera configured to take an image of a finger of a person to be authenticated, wherein the camera is located substantially in a center of a bottom of a semicircular cylinder; and
    a controller configured to perform an authentication process by the use of biometric information contained in the taken image, wherein, during the authentication process, the camera is focused in a predetermined position where the finger of the person is kept in the air on a central axis of the semicircular cylinder and prevented from coming in contact with any surface of the biometric authentication device to take the image of the finger of the person for performing the authentication process.

2. The biometric authentication device with the infection preventive function of claim 1, further comprising:
    an ultrasonic tactile sensation producing device configured to virtually produce a tactile sensation in a space by an acoustic radiation pressure of supersonic waves radiated from an ultrasonic vibrator transducer array to lead the finger of the person to be authenticated to the predetermined position in relation to the biometric authentication device by the tactile sensation.

3. The biometric authentication device with the infection preventive function of claim 2, wherein the biometric information for use in the authentication process is information about a pattern of finger veins.

4. The biometric authentication device with the infection preventive function of claim 2, wherein the biometric information for use in the authentication process is information about a fingerprint.

* * * * *